United States Patent [19]

Pritchard

[11] Patent Number: 4,555,723
[45] Date of Patent: Nov. 26, 1985

[54] APPARATUS FOR REDUCING MOTION INDUCED DISTORTION IN A FRAME COMBED CHROMINANCE SIGNAL

[75] Inventor: Dalton H. Pritchard, Princeton Township, Mercer County, N.J.

[73] Assignee: RCA Corporation, Princeton Township, Mercer County, N.J.

[21] Appl. No.: 576,241

[22] Filed: Feb. 6, 1984

[51] Int. Cl.[4] .................... H04N 9/535; H04N 5/21
[52] U.S. Cl. ................................ 358/31; 358/36
[58] Field of Search ............. 358/31, 36, 37, 166, 358/167

[56] References Cited

U.S. PATENT DOCUMENTS

| | | | |
|---|---|---|---|
| 4,232,330 | 11/1980 | Heitmann | 358/31 |
| 4,296,436 | 10/1981 | Achiha | 358/167 |
| 4,343,019 | 8/1982 | Lagoni | 358/31 |
| 4,498,099 | 2/1985 | Pritchard | 358/31 |
| 4,498,100 | 2/1985 | Bunting et al. | 358/31 |

FOREIGN PATENT DOCUMENTS

| | | |
|---|---|---|
| 3007520 | 9/1981 | Fed. Rep. of Germany . |
| 0123280 | 9/1980 | Japan ........................ 358/31 |
| 2035745 | 6/1980 | United Kingdom ........ 358/31 |
| 2114848 | 8/1983 | United Kingdom ........ 358/31 |

OTHER PUBLICATIONS

Pritchard, "ACCD Comb Filter for Color TV Receiver Picture Enhancement", RCA Review, vol. 41, Mar. 1980, pp. 3-28.

"A Motion-Adaptive System for Converting Color TV Signals into High Definition Signals", ITEJ, 7-2-80.

Primary Examiner—John C. Martin
Assistant Examiner—Michael P. Dunnam
Attorney, Agent, or Firm—E. M. Whitacre; P. J. Rasmussen; E. P. Herrmann

[57] ABSTRACT

Frame comb filters effectively separate the chrominance and luminance components of composite video signal but produce undesirable image distortion when interframe motion occurs. Luminance cross components introduced into the comb filtered chrominance signal component during interframe motion intervals contribute to the image distortion. The luminance cross components are eliminated from the comb filtered chrominance signal by successively filtering the chrominance signal with a chrominance bandpass filter and an interline chrominance comb filter.

6 Claims, 3 Drawing Figures

APPARATUS FOR REDUCING MOTION INDUCED DISTORTION IN A FRAME COMBED CHROMINANCE SIGNAL

BACKGROUND OF THE INVENTION

This invention relates to frame-to-frame comb filters for separating the luminance (Y) and chrominance (C) components of composite television signals and more particularly to means for correcting signal distortion due to the occurrence of motion between successive video frames in such a comb filter system.

Electronic signals which are periodic in nature may be processed advantageously by storing replicas of the signal which are separated in time by the repetition period and then combining the stored replicas to enhance information content of the signal. For example, conventional NTSC television broadcast systems (and most video record/playback systems) are arranged so that much of the brightness (luminance) information contained in an image is represented by signal frequencies which are concentrated about integral multiples of the horizontal line scanning frequency. Color (chrominance) information is encoded or inserted in a portion of the luminance signal spectrum around frequencies which lie halfway between the multiples of line scanning frequency (i.e., at odd multiples of one-half the line scanning frequency).

Chrominance and luminance information can be separated and detail information may be enhanced by appropriately combing the composite signal spectrum. Known combing arrangements take advantage of the fact that the odd multiple relationship between chrominance signal components and half the line scanning frequency causes the chrominance signal components for corresponding image areas on successive lines to be 180° out of phase with each other (so-called interlaced frequency components). Luminance signal components for corresponding image areas on successive lines are substantially in phase with each other (and comprise non-interlaced components).

In a comb filter system, one or more replicas of the composite image-representative signal are produced which are time delayed from each other by at least one line scanning interval such that the phase of delayed and non-delayed chrominance component are 180° out of phase. The delayed signals are added to non-delayed signals, resulting in the cancellation of the interlaced frequency components (e.g., chrominance) while reinforcing the non-interlaced frequency components (e.g., luminance). By subtracting the delayed and non-delayed signals (e.g., by inverting one of the signals and then adding the two), the non-interlaced frequency components are cancelled while the interlaced frequency components are reinforced. Thus, the luminance and chrominance signals may be mutually combed and thereby may be separated advantageously. Generally, comb filtered signal components contain lesser cross components than luminance and chrominance signal components that are separated from composite video signal by other previously employed techniques.

Interline comb filters, however, produce several undesirable features in reproduced images. First, there is a loss in vertical resolution resulting from the 15.734 KHz nulls in a 1H comb filter frequency response. (The vertical resolution can be restored, however, with appropriate additional circuitry.) Secondly, line comb filters produce "hanging dots" along sharp vertical image transitions. "Hanging dots" occur when signals from line-to-line are not substantially alike precluding the comb filter from cancelling the chrominance signal component at the luminance output of the comb filter. Thirdly, the interline comb filter produces an inherent loss of resolution along specific picture information diagonals. Because of these and other shortcomings, alternatives to the line comb filter have been sought. A solution, at least for stationary pictures, is a frame-to-frame comb filter. By design, the chrominance signal of an NTSC composite video signal is synchronized to have a 180 degree phase relationship from frame-to-frame permitting comb filtering on a frame basis. The luminance component may be extracted by linear addition of the composite signal from successive frames and the chrominance component may be extracted by linear subtraction of the composite signal from successive frames.

Consider a stationary picture, and a particular pixel of that scene. The signal redundancy or similarity for that pixel will be substantially one hundred percent from frame-to-frame. Thus if comb filtering is performed on a frame-to-frame basis, cancellation of the undesired video component in both the comb filtered luminance component and the comb filtered chrominance component will be complete regardless of image detail. "Hanging dots" do not occur because the frame comb filter combines luminance and chrominance information from the same picture point in contrast to line comb filters which combine signals from vertically adjacent picture points which may contain different information. The frame comb filter suffers neither a loss in resolution in the vertical direction nor along picture diagonals.

The frame comb filter does produce image distortions around objects in reproduced images which move between frame intervals. Differences in scene content due to object motion or camera panning that occur in the time frame of one-thirtieth of a second or faster are characterized as being visual motion of the scene content. In a frame comb filter, visual motion tends to produce image distortions around moving objects. The distortions are observable in both the horizontal and vertical directions in the plane of the image and are manifested as dual images in the reproduced scenes. The dual images are separated by an amount corresponding to the rate of motion and may consist of incorrect hue at the edges of moving colored objects, objectionable dot structure on the edges of colored objects, and low frequency color edge beats.

The image distortions result primarily from two sources. The first is an effective time lag of the luminance signal wherein edges of a moving object are represented by a signal average of the moving edge and the scene background. This effect tends to produce phantom images of the moving object. The second source of distortion results from motion induced introduction of luminance cross components into the comb filtered chrominance output signal and chrominance cross components in the comb filtered luminance output signal.

Phantom images may be considered a first order distortion and may mask distortions due to cross components. If the phantom image distortion is corrected, however, then the distortion due to luminance cross components in the chrominance signal become significant and is manifested by hue errors circumscribing moving objects, color edge beats, etc.

Phantom images may be removed by extracting the luminance cross components from the combed chrominance signal and inserting them back into the combed luminance signal. It is an object of this invention to cure the distortions due to luminance signal contaminating the combed chrominance signal.

SUMMARY OF THE INVENTION

The present invention is a video frame comb filter system with circuitry for correcting comb filtered chrominance signal during periods of interframe motion. The system includes a frame comb filter which produces a comb filtered chrominance signal from a composite video signal. The comb filtered chrominance signal is applied to a bandpass filter having a frequency response designed to pass signal occupying the spectral range of the chrominance signal. Bandpass filtered chrominance signal is applied to a signal subtraction circuit and to the input terminal of a delay element which delays the applied signal by an integral number of horizontal video lines. The delayed signal is applied to a second input terminal of the signal subtraction circuit. Output signal from the signal subtraction circuit consists of combed chrominance signal with motion induced luminance cross components removed.

The bandpass filter removes lower frequency luminance cross components. The delay element and signal subtraction circuit comprise an interline chrominance comb filter which rejects luminance cross components in the chrominance signal spectral range when they occur.

DETAILED DESCRIPTION OF THE INVENTION

Figure 1:
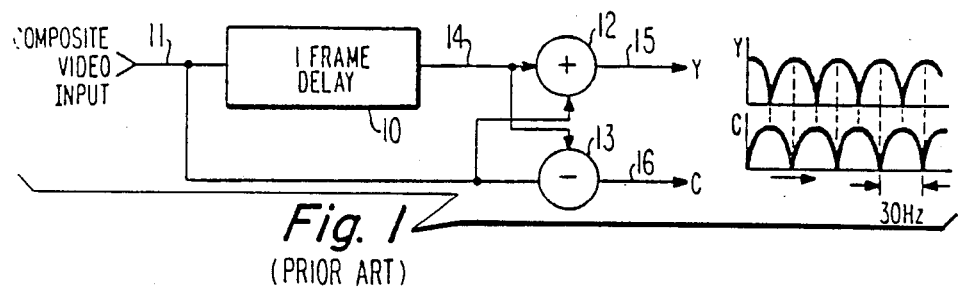
FIG. 1 is a block diagram of a frame-to-frame comb filter known in the art of TV signal processing.

FIG. 1 shows a basic frame-to-frame comb filter structure. For purposes of illustration, the apparatus will be described in terms of separating luminance and chrominance signals from a composite TV signal, however, the apparatus is not limited to this particular application. For example, the apparatus of FIG. 1 may be used to comb filter luminance signal for insertion of chrominance signal therein in the formation of a composite video signal.

In FIG. 1, a storage element 10 having the capacity to store the electrical manifestation of one frame (e.g., two fields of NTSC video format) of video signal, sequentially accepts signal from connection 11 and outputs the same signal onto connection 14 delayed by the duration of one frame period. The element 10 may comprise a digital memory, e.g., a random access memory (RAM) with the appropriate support electronics or an analog memory, e.g., a serial charge transfer device (CTD) such as a CCD with its necessary supporting circuitry. Conceptually it does not matter whether element 10 is a digital or analog circuit since, with current technology, video signals may be processed in either the digital or analog domain. It will be assumed that the memory is digital in nature. The remaining circuit elements incorporated therewith will therefore be considered to be digital devices also.

Input signal from connection 11 and delayed signal from connection 14 are summed together in the ADDER circuit 12. The luminance components of signal being in phase add while the chrominance components being 180 degrees out of phase cancel to produce a substantially chrominance free luminance signal Y at connection 15. Input signal and delayed signal are also applied to the SUBTRACTOR circuit 13 wherein the chrominance components of the two frames sum constructively while the luminance components cancel to produce a substantially luminance free chrominance signal on connection 16 (at least when successive frame signals are records of the same stationary scene).

Figure 2:
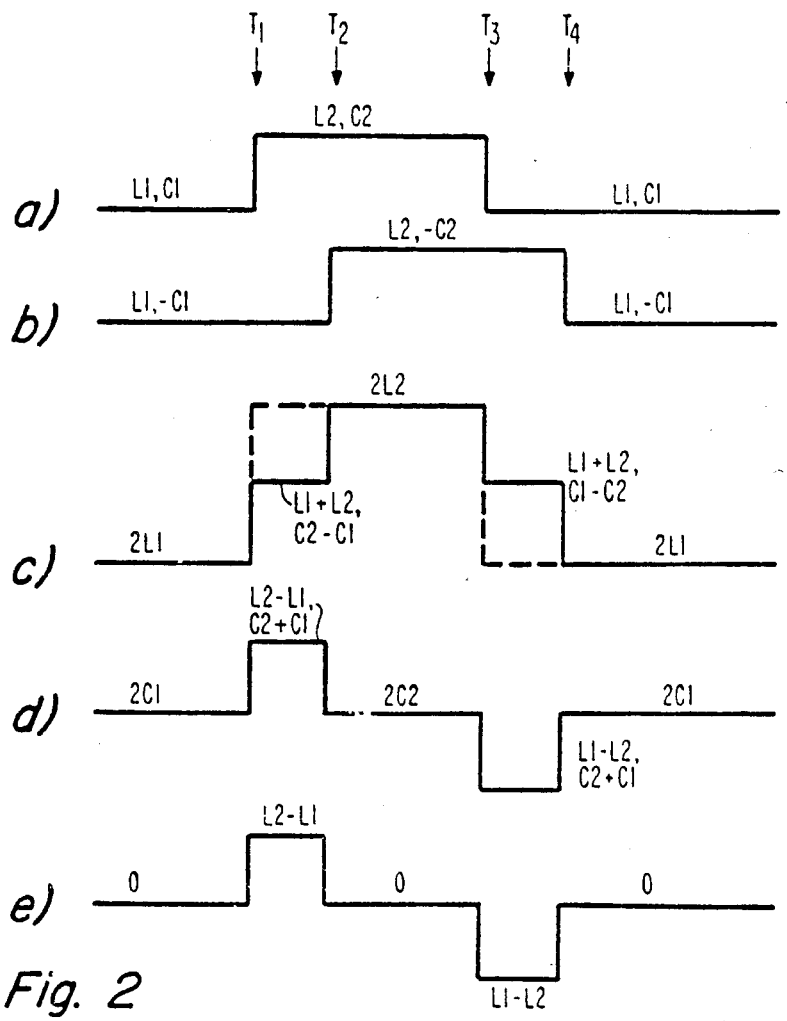
FIGS. 2a-e are amplitude versus time waveforms associated with the FIG. 1 circuit.

Referring to FIG. 2, the effects of motion on the aforedescribed frame-to-frame combing process is graphically illustrated. FIG. 2a represents a portion of the composite signal at an arbitrary time interval. FIG 2b represents the composite video signal from the same scene exactly one frame period later in time and wherein some motion has occurred in the scene. In waveform 2a, assume that the signal component between times T1 and T3 represents an object having luminance and chrominance signal parameters L2 and C2 respectively and is located in an area of uniform scene content having luminance and chrominance signal parameters L1 and C1 respectively. Between frames, the object moves spatially causing the video signal representation of the object to translate temporally, i.e., to fall between times T2 and T4 in FIG. 2b. The relative signal parameters L and C of the luminance and chrominance components of signal remain the same between the FIG. 2a and 2b waveforms though there exists a time shift with respect to the object represented by L2, C2. The chrominance component of the signal, however, has a 180 degree phase relationship between waveforms 2a and 2b (i.e., between frames). The sum and difference of the FIG. 2a and 2b waveforms are represented by the waveforms 2c and 2d respectively. It is seen that during segments of time where the absolute value of the chrominance vector component between the 2a and 2b waveforms is the same, substantially complete cancellation of the chrominance component results from summing the two waveforms (FIG. 2c). Similarly, where the amplitude of the luminance component of the signal is the same between the two waveforms (2a and 2b) substantially complete cancellation of the luminance component results from a subtraction of the two waveforms (FIG. 2d). FIGS. 2a, 2b, 2c and 2d are representative of signals occurring respectively at connections 11, 14, 15 and 16 of the FIG. 1 circuit.

Over the period where motion occurs between frames, i.e., between times T1 and T2 and times T3 and T4, unequal signals are being differentially summed, and incomplete cancellation of the undesired component occurs.

In addition, the motion causes an averaging of the desired signal componenet over the periods where motion occurs. These averages are represented in FIG. 2c by the signal segments denoted (L1+L2). Normally the signal from the two frames will be weighted by a factor of ½ before being combined. The amplitude of the combed signal will be ½ the values shown and the signal during the motion period will be (L1+L2)/2. The averages (L1+L2) in the luminance signal tend to replicate the signal transitions and produce a double or phantom image which circumscribes the moving object.

Low pass filtering the combed chrominance signal of FIG. 2d produces the signal shown in FIG. 2e. In FIG. 2e, the chrominance signal spectrum has been removed, leaving only the uncancelled luminance component resulting from the interframe motion. If the signal of FIG. 2e is added or subtracted to the signal of FIG. 2c, the edges of the luminance signal will be restored, producing a luminance signal which accurately represents the moving object. Addition of the FIG. 2e signal will restore the luminance signal of FIG. 2c between times T1 to T2 to the level of 2L2 and reduce the luminance signal between times T3 and T4 to the value of 2L1 as indicated by the broken lines.

Adding signals derived from low pass filtering the comb filtered chrominance component back into the comb filtered luminance signal does not effect complete restoration of the luminance signal, i.e. phantom images are not completely eliminated. The reason for this is the bandwidth of the compensating signal is narrower than the luminance bandwidth due to the low pass filter. Higher frequency components of the signal needed to completely compensate or correct the luminance signal reside in the spectral band occupied by the chrominance signal. By virtue of low pass filtering the chrominance signal to obtain the compensating signal the higher frequency compensating components are necessarily excluded from the filter output signal.

To account for the missing high frequency compensating signal components the luminance signal may be low pass filtered during interframe image motion periods with a low pass filter having a similar frequency response to the low pass filter which produces the compensating signal. Low pass filtering the luminance signal has the effect of eliminating the high frequency components of the L1+L2 signal illustrated in FIG. 2C. Adding the signal derived from low pass filtering the chrominance signal into the low pass filtered luminance signal will completely compensate the luminance signal in the intervals T1+T2 and T3−T4.

Figure 3:
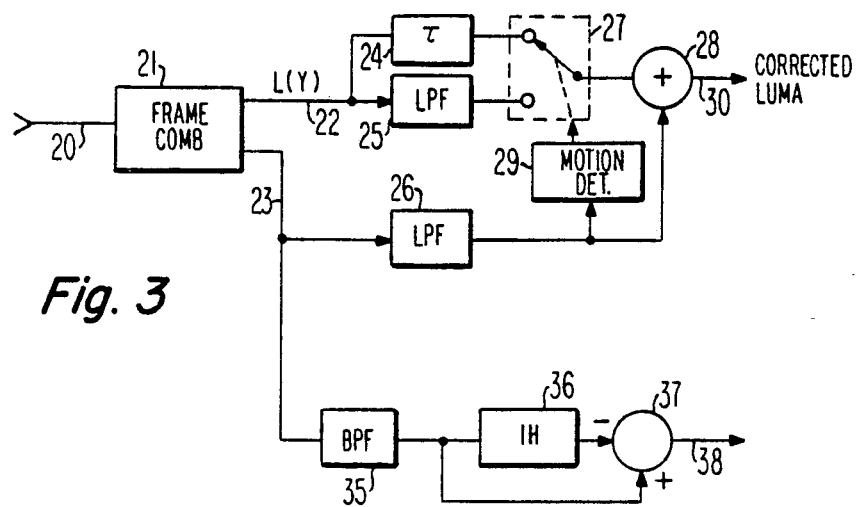
FIG. 3 is a block diagram of a frame-to-frame comb filter system including circuitry for correcting motion induced artifacts in the comb filtered signals.

FIG. 3 shows circuitry which performs luminance signal compensation and circuitry to eliminate luminance cross components from the frame comb filtered chrominance signal. In FIG. 3 composite video is applied at terminal 20 to the input connection of a frame comb filter 21. Frame comb filter 21 may be of the type illustrated in FIG. 1 or it may contain multiple frame or multiple field delay elements as is known in the art. Frame comb 21 produces a luminance signal component, L, (or more traditionally Y) at output connection 22 and a chrominance signal component, C, on output connection 23. The signal components on output connections 22 and 23 are represented by signals 2c nd 2d respectively (in FIG. 2 ) for moving images.

The chrominance component is applied to low pass filter 26 which removes the chrominance signal and outputs the low frequency luminance cross components occurring in the chrominance signal during interframe image motion. The low passed signal is applied to one input terminal of signal combining circuit 28. Note that in the absence of motion, low pass filter 26 produces no motion descriptive signal. Therefore, if a threshold detector, 29, is connected at the output terminal of the low pass filter 26, the occurrence of interframe motion may be detected.

As mentioned previously, to completely compensate or correct the motion induced artifacts in the luminance signal, the frame combed luminance signal should also be low pass filtered. The frequency response of the luminance low pass filter should correspond to the frequency response of the chrominance low pass filter. However, it is undesirable to low pass filter the luminance signal in the absence of motion since to do so will eliminate high frequency detail in the reproduced image. The loss of detail in the immediate area of moving objects is significantly less noticeable or objectionable. Thus, the circuitry is arranged to low pass filter the luminance signal only when motion is detected.

In FIG. 3, the luminance signal on connection 22 is applied to both a low pass filter 25 and a signal delay element 24. Delay element 24 delays the luminance signal by a period of time equivalent to the group delay of filters 25 and 26. Output signals from delay element 24 and low pass filter 25 are applied to respective poles of switch 27. Switch 27 responsive to signal from motion detector 29 applies delayed luminance signal from delay element 24 to a second input terminal of signal combining circuitry 28 in the absence of interframe motion. Switch 27 alternatively applies low pass filtered luminance signal to circuitry 28 on the occurrence of interframe motion.

Signal combining circuitry 28 linearly adds the luminance signal and the luminance component extracted from the combed chrominance signal to produce a motion corrected luminance signal on output terminal 30. Alternatively, circuitry 28 may be arranged to subtractively combine the two signals with the result that the corrected luminance signal would correspond in time to signal 2b rather than signal 2a.

Two comments are in order at this point. First it may be noted from FIG. 2c that the frame comb filtered luminance signal contains a chrominance signal contamination (i.e. C2−C1) during motion intervals. This chrominance signal is, however, removed by the low pass filter 25 in the luminance signal path. Secondly, the motion detector 29 will have an inherent delay between motion signal occurring at its input terminal and a motion detection signal at its output terminal. Therefore, it may be necessary to include signal delays to account for the detector delay, e.g. in the luminance path before low pass filter 25 and delay element 24 and after the interconnection of the motion detector in the low passed filter 26 signal path.

As noted previously, once the comb filtered luminance signal has been corrected, luminance cross components in the comb filtered chrominance signal produce observable and objectionable image distortions. The luminance cross components are removed from the chrominance signal by the cascade connection of a chrominance bandpass filter and an interline chrominance comb filter. As used herein, a chrominance comb filter is one which constructively combines delayed and non-delayed chrominance signal components of applied signal. In FIG. 3, a chrominance bandpass filter 35 is coupled to the chrominance output connection 23 of the frame comb filter. Bandpass filter 35 is a linear phase filter over the chrominance signal frequency range and rejects signal frequency components outside the chrominance signal band. Thus, bandpass filter 35 eliminates the lower frequency components of the luminance cross components.

The output terminal of bandpass filter 35 is coupled to the input connection of an interline chrominance comb filter. The interline comb filter includes a delay element 36 and signal subtraction circuit 37. Delay element 36 delays applied signal by an integral number of horizontal line periods. Bandpass filtered chrominance signal from filter 35 and delayed signal from delay element 36 are applied to the signal subtraction circuit 37. The remaining luminance cross components are substantially similar from line-to-line and therefore cancel. The chrominance signal is also substantially similar from line-to-line but 180 degrees out of phase and therefore combine constructively. The signal produced by signal subtraction circuit 37 on connection 38 is chrominance signal free of luminance cross components.

It will be recognized by those skilled in the art of video processing that the output signals produced by frame comb filter 21 and the interline comb filter (36, 37) are twice the amplitude of the composite signal components because the comb filters constructively combine delayed and non-delayed signals. Therefore, it may be desirable to include circuitry (e.g. circuits which divide by a factor of two) in the comb filter output connections to renormalize the signals. It will also be recognized that the positions of the bandpass filter and interline comb filter in the FIG. 3 arrangement may be interchanged.

What is claimed is:

1. Apparatus for providing the chrominance component from a composite video signal comprising:
   a source of composite video signal;
   a frame comb filter having an input terminal coupled to said source and an output port at which frame comb filtered chrominance signal is available;
   a bandpass filter having a passband occupying the frequency band of the chrominance component, said bandpass filter having input and output terminals;
   an interline chrominance signal comb filter having input and output terminals;
   a chrominance signal output terminal; and
   means for cascade connecting said bandpass filter and said interline comb filter between the chrominance signal output terminal and the frame comb filter chrominance output terminal.

2. The apparatus set forth in claim 1 wherein the interline comb filter comprises:
   a delay element for delaying applied signal by one horizontal video line period, having an input terminal and an output terminal;
   a signal subtraction circuit having first and second input terminals coupled to the input and output terminals of said delay element, and having an output terminal and wherein the output terminal of said signal subtraction circuit is coupled to said chrominance output terminal.

3. The apparatus set forth in claim 2 wherein said frame comb filter inludes an output terminal at which comb filtered luminance signal is available and said apparatus further comprises:
   means coupled to the chrominance output terminal of said frame comb filter for rejecting signal components in the frequency band occupied by chrominance signal; and
   means coupled to the means for rejecting signal components in the chrominance frequency band and coupled to the luminance output terminal of the frame comb filter for linearly combining signals to insert cross components occurring in the comb filtered chrominance signal into the comb filtered luminance signal.

4. A method for eliminating luminance cross components from a frame comb filtered chrominance signal comprising successively filtering said chrominance signal with the cascade connection of a chrominance bandpass filter and an interline chrominance comb filter.

5. The method set forth in claim 4 wherein the chrominance signal is bandpass filtered before being interline comb filtered.

6. Apparatus for separating the chrominance signal component from composite video signal comprising:
   a source of composite video signal;
   a frame comb filter having an input terminal coupled to said source and an output terminal at which frame comb filtered chrominance signal is available;
   an interline comb filter having an input terminal coupled to the output port of said frame comb filter and an output terminal at which said separated chrominance signal component is available.

* * * * *